United States Patent [19]

Williams, III

[11] 4,092,297

[45] May 30, 1978

[54] POLYTHIOETHERMIDES

[75] Inventor: Frank J. Williams, III, Scotia, N.Y.

[73] Assignee: General Electric Company, Schenectady, N.Y.

[21] Appl. No.: 500,137

[22] Filed: Aug. 23, 1974

[51] Int. Cl.$^2$ ............................................. C08G 73/10
[52] U.S. Cl. ........................... 260/47 CP; 260/47 R; 260/46.5 E; 260/65; 260/78 TF; 260/79
[58] Field of Search ............... 260/47 CP, 65, 78 TF, 260/79 R, 47 R, 46.5 E

[56] References Cited

U.S. PATENT DOCUMENTS

| | | | |
|---|---|---|---|
| 3,234,181 | 2/1966 | Olivier | 260/47 |
| 3,377,310 | 4/1968 | Serlin et al. | 260/33.4 |
| 3,422,064 | 1/1969 | Gall | 260/47 |
| 3,748,338 | 7/1973 | Darmory et al. | 260/30.2 |

Primary Examiner—Lester L. Lee
Attorney, Agent, or Firm—W. A. Teoli; J. T. Cohen; M. Snyder

[57] ABSTRACT

Polythioetherimides are provided by either effecting reaction between aromatic bis(thioetheranhydride) and organic diamine or by nitro- or halo-displacement from appropriately substituted bis(phthalimide) with anhydrous alkai metal sulfide. The polythioetherimides are heat and flame resistant and can be reinforced with various fillers to produce high performance composites. The polythioetherimides also can be used as wire coating enamels when used in phenolic solvent.

3 Claims, No Drawings

POLYTHIOETHERMIDES

The present invention relates to polythioetherimides and methods for making such materials.

The polythioetherimides of the present invention consist essentially of the following chemically combined units,

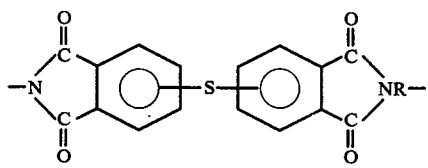
(I)

where R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms $C_{(2-8)}$ alkylene terminated polydiorganosiloxane, and (c) divalent radicals included by the formula,

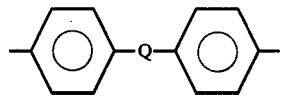

where Q is a member selected from the class consisting of

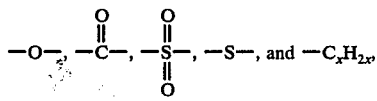

and x is a whole number from 1 to 5 inclusive.

The polythioetherimides of formula (1) are polymers consisting essentially of from about 2 to 5000 units and preferably can consist of from 2 to 100 of the following chemically combined units,

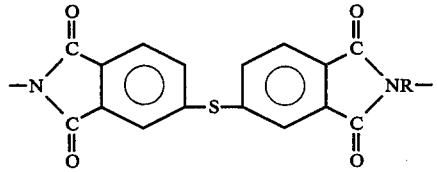
(III)

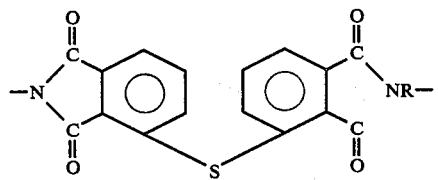
(IV)

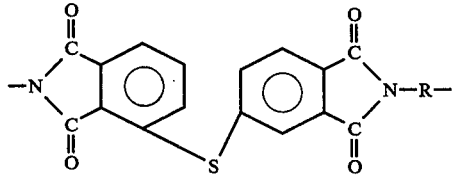
(V)

and mixtures thereof, where R is defined above.

The polythioetherimides of formulas I–V can be made by effecting reaction between aromatic bis(thioetheranhydride) of the formula,

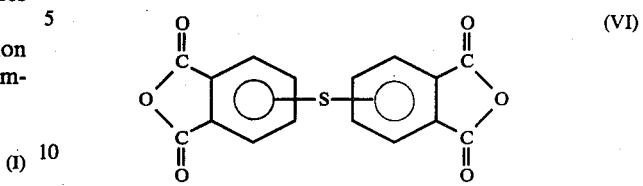
(VI)

and organic diamine of the formula,

(VII)

where R is as previously defined.

There can be employed from 0.5 to 2 moles of aromatic bis(thioetheranhydride) per mole of organic diamine. It is preferred to employ substantially equal molar amounts of bisanhydride and diamine.

The aromatic bis(thioetheranhydride) of formula VI and organic diamine of formula VII can be stirred in the presence of a dipolar aprotic organic solvent under ambient conditions to produce a polyamide acid. Depending upon the solids content of the polyamide acid solution, reaction time can vary between a few minutes or less to an hour or more. At the completion of the reaction, the solution can be cast on a substrate to facilitate the removal of organic solvent. The cast polyamide acid film can be heated to an elevated temperature in a step-wise manner. After the initial heat treatment which can be, for example, up to 150° C. or higher, the film can be heated to a higher temperature, for example, 200°–300° C. for an hour or more to convert the polyamide acid to the polyimide state. Experience has shown that polythioetherimide made from polyamide acid produced at "ambient temperatures" is generally insoluble in organic solvents other than phenolic solvents. It can be employed as a wire coating enamel and impart solvent resistant properties to various substrates.

In addition to the above "ambient temperature method", another method which can be employed to make polythioetherimides consisting essentially of chemically combined units of formula I is the "high temperature method". Reaction is effected between the aromatic bis(thioetheranhydride) of formula VI and the organic diamine of formula VII in the presence of a phenolic solvent at temperatures of from 100° to 250° C. and preferably 130° to 200° C. Water of reaction is removed to facilitate polythioetherimide formation. A mixture of a low boiling and higher boiling solvent also can be used which serves as an azeotroping agent.

Suitable organic solvents for making the polythioetherimide reaction products by the high temperature method are any phenolic solvents and organic solvents boiling between 110° to 400° C. and inert to the polyetherimide. The term phenolic solvent includes phenol and mixtures of o-, p- and m-cresols known as cresylic acid and mixtures of cresylic with phenol. In addition phenolic solvent also includes ethylphenols, isopropylphenols, tertbutylphenols, xylenols, chlorophenols, dichlorophenols, phenylphenols, etc. Solvents also included are, for example benzene, toluene, xylene, chlorobenzene, dichlorobenzene, etc., which can be used in combination with the phenols solvents.

Another method which can be used to make the polythioetherimides of formula I is by melt polymerization of aromatic bis(thioetheranhydride) of formula VI and organic diamine of formula VII at temperatures of 100° to 400° C.

The above polythioetherimide reaction products of aromatic bis(thioetheranhydride) of formula VI and organic diamine of formula VII are soluble in phenolic solvents and can be cast from a phenolic solvent solution to a thermoplastic film. These polythioetherimides can be molded at temperatures up to 500° C. When employed with phenolic solvent, the polythioetherimide can be used as a wire coating enamel.

The aromatic bis(thioetheranhydride)s of formula VI and method for making are shown in my copending application Ser. No. 346,470, filed Mar. 30, 1973, and assigned to the same assignee as the present invention. These dianhydrides can be prepared by effecting reaction between an alkali metal sulfide, $M_2S$, and an N-substituted phthalimide of the formula

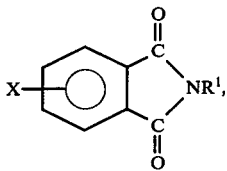

to produce an intermediate N-substituted bis(thioetherphthalimide) of the formula

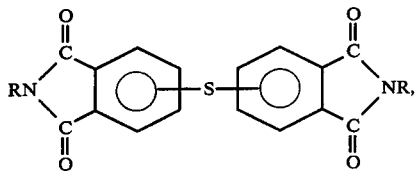

thereafter hydrolyzing the bis(thioetherphthalimide) in the presence of base to produce the corresponding bis(-thioetherphthalic) acid salt, acidifying the bis(thioetherphthalic) acid salt to produce the corresponding tetra-acid and thereafter dehydrating the tetra-acid to the dianhydride of formula VI, where X is a radical selected from fluoro, chloro, bromo, iodo and nitro, $R^1$ is a monovalent radical selected from $C_{(1-8)}$ alkyl radical, and $C_{(6-20)}$ aromatic radicals, and M is an alkali metal such as sodium, potassium and lithium.

Radicals included by $R^1$ are, for example, methyl, ethyl, propyl, butyl, pentyl, etc., phenyl, tolyl, xylyl, naphthyl, chlorophenyl, bromotolyl, etc.

Included by the bis(thioetherphthalic anhydride)s of formula VI are bis(2,3-dicarboxyphenyl)sulfide dianhydride, bis(3,4-dicarboxyphenyl)sulfide dianhydride, 2,3-dicarboxyphenyl-3',4'-dicarboxyphenylsulfide dianhydride, etc.

A further method of making the polythioetherimides of formula I is by effecting reaction in the presence of a dipolar aprotic solvent between a bis(phthalimide) of the formula,

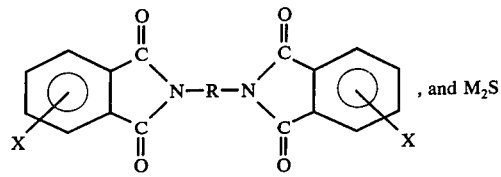, and $M_2S$ where R, M and X are as previously defined.

Included by the organic diamines of formula VII are, for example,
m-phenylenediamine;
p-phenylenediamine;
4,4'-diaminodiphenylpropane;
4,4'-diaminodiphenylmethane;

benzidine;

4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-diaminotoluene;
2,6-diaminotoluene;
2,4-bis(β-amino-t-butyl)toluene;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;

decamethylenediamine;

3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
2,4-diaminotoluene;
2,6-diaminotoluene;
bis(3-aminopropyl)tetramethyldisiloxane, etc.

The polythioetherimides of formula I can be reinforced with various particulated fillers such as glass fiber, silica fillers, carbon whiskers, up to 50% by weight of the resulting total blend. Reinforcement of polymer can be accomplished prior to polymer formation by effecting polymerization in the presence of filler. Melt blending and solution blending also can be employed.

In order that those skilled in the art will be able to practice the invention, the following examples are given by way of illustration and not by way of limitation. All parts are by weight.

EXAMPLE 1

A mixture of 1.66 part of bis(2,3-dicarboxyphenyl)-sulfide dianhydride and 1 part of methylene dianiline was stirred with 25 parts of distilled meta-cresol and 13 parts of anhydrous toluene. The mixture was heated in an oil bath and the water formed in the reaction was removed by azeotropic distillation. Some toluene was removed by distillation until the internal temperature of the reaction mixture was 170° C. The mixture was stirred for 8 hours at this temperature and then diluted with a 70:30 mixture of phenol:toluene. The cooled reaction mixture was added dropwise to methanol in a blender and the resulting precipitated polymer was collected by filtration. The polymer was initially dried in a vacuum oven at 100° C. and then in a drying pistol containing refluxing ortho-dichlorobenzene at 0.25 mm pressure. There was obtained a 2.2 parts of dried polymer having an intrinsic viscosity of 0.89 in cresol at 25° and a $t_g$ of 277° C. and an oxygen index of 43. Based on method of preparation the polymer was a polythioetherimide consisting essentially of the following chemically combined units

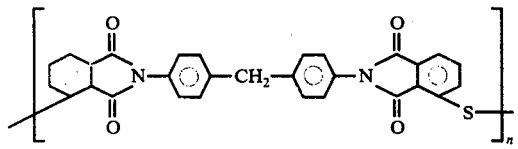

A sample of the polymer was blended with 50% by weight of fume silica. The blend was molded to a shaped composite exhibiting heat and flame resistance plus increased strength and flexibility.

EXAMPLE 2

A mixture of 1.63 part of bis(3,4-dicarboxyphenyl) sulfide dianhydride an 1 part of oxydianiline was stirred with 25 parts of distilled meta-cresol and 13 parts of toluene. Following the procedure of Example 1, there was obtained 2.16 parts of a polythioetherimide having an intrinsic viscosity in cresol of 0.76 and a $t_g$ of 253° C.

A 10% solution was prepared of the above polymer in meta-cresol. Short lengths of copper wire were insulated by dip coating the wire in the solution until 4-coats of enamel had been applied. The wire was heated in vacuo after each treatment to remove the solvent. The coating was resistant to chloroform, methylene chloride, water and dimethylacetamide.

EXAMPLE 3

A mixture of 2.81 parts of bis(2,3-dicarboxyphenyl) sulfide dianhydride and 1 part of hexamethylenediamine was stirred in 20 parts of distilled meta-cresol and 10 parts of anhydrous toluene. Following the same procedure, as Example 1, there was obtained 3.05 parts of a polythioetherimide having an intrinsic viscosity in meta-cresol of 0.50 and a $t_g$ of 136° C., and an oxygen index of 22. Based on method of preparation the polyetherimide consisted of the following chemically combined units

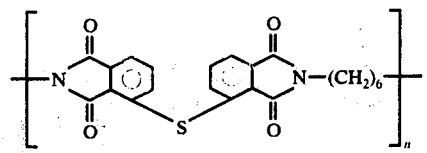

A mixture of 10 parts of the above polymer and 4.6 parts of chopped glass fibers was stirred in the melt at 150° C. for 20 minutes to produce a glass filled polythioetherimide.

EXAMPLE 4

A mixture of 1.7164 parts of bis(3,4-dicarboxyphenyl) sulfide and 0.6116 parts of hexamethylenediamine was stirred at 200° C. under a nitrogen atmosphere. After 10 minutes at 200° C. the temperature of the mixture was raised to 290° C. and the stirring was continued at this temperature for 30 minutes. During this time, a vacuum was applied to help assist in removing the water. The mixture was cooled to room temperature and dissolved in m-cresol. The m-cresol solution was added to methanol and the desired polymer was collected by filtration to give a 90% yield of material having an intrinsic viscosity in cresol of 1.33 and a $t_g$ of 118° C.

EXAMPLE 5

A mixture of 0.75 parts of anhydrous sodium sulfide, 35 parts of anhydrous DMF and 5.30 parts of the bisnitro imide derived from 3-nitrophthalic anhydride and methylene dianiline was stirred at 70° C. under a nitrogen atmosphere for 3 hours. The mixture was cooled to room temperature and poured into methanol. The resulting precipitate was collected by filtration. There was obtained 4.0 parts of dried polymer having an intrinsic viscosity of 0.105 in cresol at 25° and a $t_g$ of 265° C. Based on method of preparation the polymer was a polythioetherimide consisting essentially of the following chemically combined units:

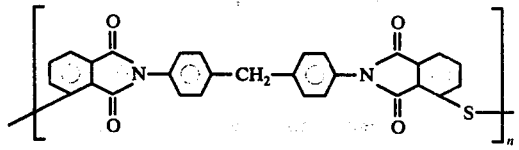

EXAMPLE 6

A mixture of 0.488 g of anhydrous sodium sulfide, 3.226 g of the bisimide derived from 3-chlorophthalic anhydride and oxydianiline and 23 parts of anhydrous DMF was stirred at reflux under a nitrogen atmosphere for 16 hours. The solution was cooled to room temperature and poured into methanol. The resulting precipitate was collected by filtration and dried to give 2.9 parts of polymer having an intrinsic viscosity of 0.31 in cresol at 25° C. and a $t_g$ of 260° C. Based on method of preparation, the polymer was a polythioetherimide consisting essentially of the following chemically combined units.

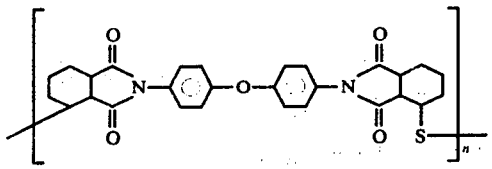

EXAMPLE 7

A mixture of 7.000 parts of bis(3,4-dicarboxyphenyl) sulfide, 2.2741 parts of m-phenylenediamine and 0.1271 parts of phthalic anhydride was stirred at reflux with 31 parts of m-cresol and 15 parts of toluene. Following the same procedure as described in Example 1, there was obtained 8.05 parts of a polythioetherimide consisting essentially of the following chemically combined units:

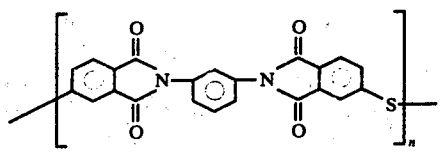

Although the above examples are limited to only a few of the very many variables which can be used in the practice of the present invention, it should be understood that the present invention is directed to a much broader class of polythioetherimides having chemically combined units of formula I, which can be made by various procedures shown in the description preceding the examples.

What I claim as new and desire to secure by Letters Patent of the United States is:

1. A method of making polythioetherimide which comprises effecting reaction in the presence of a cresol solvent between from 0.5 to 2 moles of aromatic bis(thioetheranhydride) of the formula

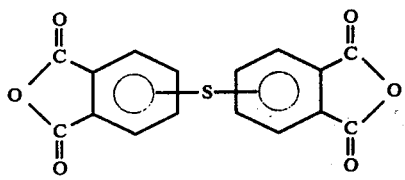

per mole of organic diamine of the formula,

at temperatures of from 100° to 250° C, where R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) diavlent radicals included by the formula,

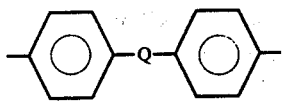

where Q is a member selected from the class consisting of

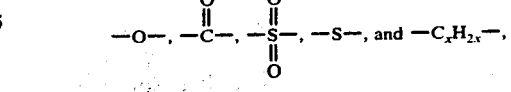

and $x$ is a whole number from 1 to 5 inclusive.

2. A method of making polythioetherimide which comprises effecting reaction at a temperature of between about 70° C to about reflux in the presence of a dipolar aprotic solvent between substantially equal molar amounts of a bis-(phthalimide) of the formula

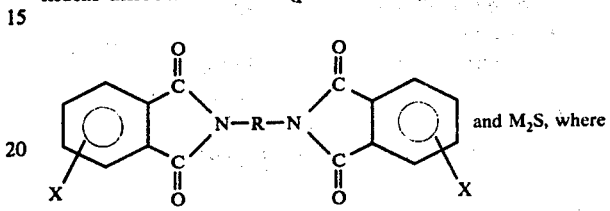

and $M_2S$, where M is an alkali metal, X is a displaceable radical selected from nitro and halo and R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula,

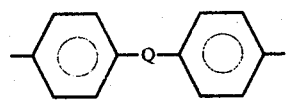

where Q is a member selected from the class consisting of

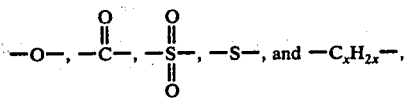

and $x$ is a whole number from 1 to 5 inclusive.

3. A method for making polythioetherimide which comprises stirring the melt of a mixture of from 0.5 to 2 moles of aromatic bis(thioetheranhydride) of the formula

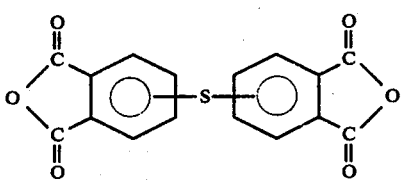

per mole of organic diamine of the fomrula

at a temperature in the range of from 100° to 400° C where R is a divalent organic radical selected from the class consisting of (a) aromatic hydrocarbon radicals having from 6–20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula,
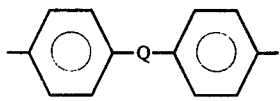
where Q is a member selected from the class consisting of
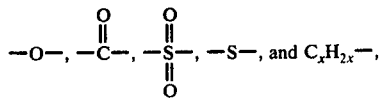
and $x$ is a whole number from 1 to 5 inclusive.
* * * * *